US009415978B2

(12) United States Patent
Fenger

(10) Patent No.: US 9,415,978 B2

(45) Date of Patent: Aug. 16, 2016

(54) CRANE WITH DOUBLE WIRE GUIDE AND ANCHORING BRACKET ARRANGED IN THE NACELLE OF A WIND TURBINE

(71) Applicant: Liftra IP ApS, Aalborg SV (DK)

(72) Inventor: Per Fenger, Terndrup (DK)

(73) Assignee: LIFTRA IP ApS, Aalborg SV (DK)

( * ) Notice: Subject to any disclaimer, the term of this patent is extended or adjusted under 35 U.S.C. 154(b) by 0 days.

(21) Appl. No.: 14/440,945

(22) PCT Filed: Sep. 8, 2013

(86) PCT No.: PCT/DK2013/050286
§ 371 (c)(1),
(2) Date: May 6, 2015

(87) PCT Pub. No.: WO2014/071949
PCT Pub. Date: May 15, 2014

(65) Prior Publication Data

US 2015/0284218 A1 Oct. 8, 2015

(30) Foreign Application Priority Data

Nov. 6, 2012 (DK) ................................ 2012 00697

(51) Int. Cl.
*B66C 23/18* (2006.01)
*F03D 1/00* (2006.01)

(52) U.S. Cl.
CPC .............. *B66C 23/185* (2013.01); *F03D 1/003* (2013.01); *F05B 2240/916* (2013.01); *Y02E 10/728* (2013.01)

(58) Field of Classification Search
CPC .... B66C 23/18; B66C 23/185; B66C 23/207; F05B 2240/916; F03D 1/003
See application file for complete search history.

(56) References Cited

U.S. PATENT DOCUMENTS 3,899,083 A 8/1975 Flessner et al.
9,290,362 B2 * 3/2016 Hey ........................ B66C 13/02

FOREIGN PATENT DOCUMENTS

EP 1 101 934 A2 5/2001
WO 2011/050812 A1 5/2011

* cited by examiner

*Primary Examiner* — Sang Kim
*Assistant Examiner* — Juan Campos, Jr.
(74) *Attorney, Agent, or Firm* — David S. Safran

(57) ABSTRACT

A crane includes a double wire guide and anchoring bracket arranged in the nacelle of a wind turbine for hoisting-up and -down of heavy parts of the wind turbine arranged in the nacelle. The crane includes an external winch with wires, located near the base of the tower of the wind turbine, the winch being connected via the wire guide to a pulley block including a crane hook at the end of the crane outrigger arm. The particular by the wire guide is, that it by two set of pivotally mounted wire wheels, mounted respectively on a fixed bracket part of the crane, and the pivotal mounted part of the crane, controls the wires of the crane within an pivot interval between +/−175 degrees from a 0-reference point, so that the wires never touch each other.

5 Claims, 5 Drawing Sheets

10
31
34
28
42
63
62
64
60
63
65
66
54
44
31
32
29
26
38
31
40
50
32
50

78
34
32
66
65
70
63
64
42
40
10
56
54
44
52
50
48
46
68
60
62

CRANE WITH DOUBLE WIRE GUIDE AND ANCHORING BRACKET ARRANGED IN THE NACELLE OF A WIND TURBINE

BACKGROUND OF THE INVENTION

1. Field of the Invention

The present invention relates to a crane with double wire guide and anchoring bracket arranged in the nacelle of a wind turbine, for hoisting-up and -down heavy parts of the wind turbine arranged in the nacelle, said crane comprises a yaw and an external winch with wire, located near the base of the wind turbine tower, said winch being connected via the wire guide to a pulley block comprising a crane hook at the end of the crane outrigger arm.

2. Description of Related Art

When servicing in particular larger wind turbines, mobile cranes located on the ground are often used. Said mobile cranes includes a high tower, which typically consists of sections defined lattice structure which is assembled before the crane is used. This results in a significant time consumption for the erection of the crane, which every time its position need to be amended, requires that the tower be dismantled. This results in high costs, which is undesirable.

Often wind turbines installed in wind farms where the turbines are serviced by a particular schedule, and for this purpose we have developed a crane system of the kind where a small crane davit-type first established in the turbine nacelle, where it is anchored to a stable structural parts then this crane is used to hoist parts for the aforementioned crane, whose games are arranged on the ground at the mill stand. The parts for the aforementioned crane typically consists of an anchoring bracket which is anchored to stable structural components in the nacelle, after which the actual crane in which the cable guide is included, placed and anchored on the anchoring console, then heavier parts of the wind turbine placed inside and outside the nacelle can be handled by crane, the remote control of the game.

Often wind turbines installed in wind farms where the turbines are serviced according to a specific schedule, and for this purpose has been developed a crane system of the kind stated in the preamble, where a small crane of the davit-type is first established in the turbine nacelle, where it is anchored to a stable structural parts, then this crane is used to hoist parts for the aforementioned crane, whose winces are arranged on the ground near the base of the wind turbine tower. The parts for the aforementioned crane typically consists of an anchoring console which is anchored to stable structural components in the nacelle, after which the actual crane in which the wire guide is included, placed and anchored on the anchoring console, then heavier parts of the wind turbine placed inside and outside the nacelle can be handled by crane, by remote control of the winch.

The problem with the use of this type of crane is however to prevent the wires to come into contact with each other when performing yawing with the crane, as this can cause them to become damaged, and even worse, torn apart, and consequently loss of load in the crane hook, with subsequent danger to personnel working within the crane's operating radius.

Wires are introduced from known positions and passed through a yaw which comprises a fixed outer drum, and a therein rotatable mounted inner drum to which the crane outrigger arm is attached, and where the rotation of the crane is performed by means of a yaw mechanism. The wires are further guided out of the inner drum to the crane outrigger arm from known positions to the crane arm and hoist block hanging on this, and it is recognized that a rotation/yawing at 360 degrees will not be possible to perform with cranes of this type, without the wires in contact with each other.

SUMMARY OF THE INVENTION

It is the object of the invention to provide a solution which provides for the possibility to carry out yawing with the crane in a adequate extent, while it is also ensured that the crane wires does not come into contact with each other.

It is intended to achieve a yawing of approximately +/−175 degrees sideways relative to zero, which will ensure an adequate optimal freedom of operation of the crane.

It is by the invention realized that this is possible by means of a crane with a double wire guide and anchor bracket of the kind specified, which is characterized in, that the wire guide comprises a first fixed part arranged on an anchoring bracket for the crane, and a therewith cooperating second part, arranged in a second pivotal part of the crane, said second pivotal part being connected with the first part by the wires, where the first fixed part comprises a first oblong console, the free ends of which each comprises track cut first wire wheels, and between said track cut first wire wheels, further two, second track cut wire wheels, at a first and a second pivotal connection, so arranged on the console, that the bottom of the tracks of the second track cut wire wheels at any time are located on the tangent line between the bottom of the tracks of the first track cut wire wheels, and where the second part of the wire guide is located in a level above the first part, and includes, by third and fourth pivot connections mounted third track cut wire wheels, whereby the bottom of the third track cut wire wheels are rotatable about their uppermost tangent and where the second part further comprises fourth fixed track cut wire wheels, and where the tangent lines between the first and second set of track cut wire wheels and respectively the third and fourth track cut wire wheels are running in parallel.

Hereby is achieved that directional deviations of the wires by yawing are absorbed by rotation of the second pivotally mounted track cut wheels around the first and second pivotal connection on the, to the anchoring bracket fastened first fixed part of the double-wire guide, and rotation of the third, pivotal mounted track cut wheels around the third and fourth pivotal connection, anchored in the internal, pivotally mounted drum of the crane, so that the wires at any time are guided into the drum from a known position, and leave it from a different known position which depends on the degree of rotation of the crane relative to the zero point.

With regard to flexibility of the crane, it may be appropriate that the first part of the wire guide is releasable attached to an anchoring bracket of crane arranged in the nacelle, and said the anchor plate being secured to the stable structural parts in the wind turbine nacelle.

In a preferred embodiment of the double wire guide according to the invention, the second part of the double wire guide may be arranged in an inner tube shaped drum, which is pivotally mounted inside an outer tube shaped drum which is anchored to the anchoring bracket, and pivotal around its center axis by a yaw mechanism.

In the intent to achieve a stable control of the wires, the double wire guide may advantageously be so arranged that the third and fourth track cut wire wheels in the second part of the wire guide is mounted in a bracket which is anchored in the inner tubular drum, to which bracket the third track cut wire wheels are pivotally mounted around their upper tangent lines at first fixtures with a first and a second end, which by the third and fourth pivotal connections are pivotally mounted to the bracket, and wherein the fourth track cut wire wheels are anchored to the bracket by second fixtures at a level above the first fixtures.

In a particular preferred embodiment of the double-wire guide, the third track cut wire wheels may be mounted nearest to the first end of the first fixtures, and first fixtures may nearest their second end, and on the adjacent facing sides to the fourth track cut wire wheels, comprise take outs, the geometry of which corresponds to a part of the facing periphery of the adjacent fourth track cut wire wheels, for receiving said parts of it to an extent where respectively the upper horizontally oriented tangent lines of the bottom of the third track cut wire wheels coincide with the lower horizontally oriented tangent lines in the bottom of the fourth track cut wire wheels, and the center axes of the third and fourth pivot connections.

Hereby is achieved a highly stable and reliable guiding of the wires which passes the double wire guide, as the deviations of the direction of the wires during yawing with the crane are completely compensated for by relative turns of the second and the third track cut wire wheels, respectively, by turning of said wire wheels around respectively the first pivot and second connection and the third and fourth pivot connection, thereby ensuring that the wires regardless of the degree of rotation of the crane within its operating limits will be guided safely to and from the known positions where the wires are brought into and out of the inner drum The invention is explained in more detail in the following with reference to the drawing, in which

DETAILED DESCRIPTION OF THE INVENTION

Figure 1:
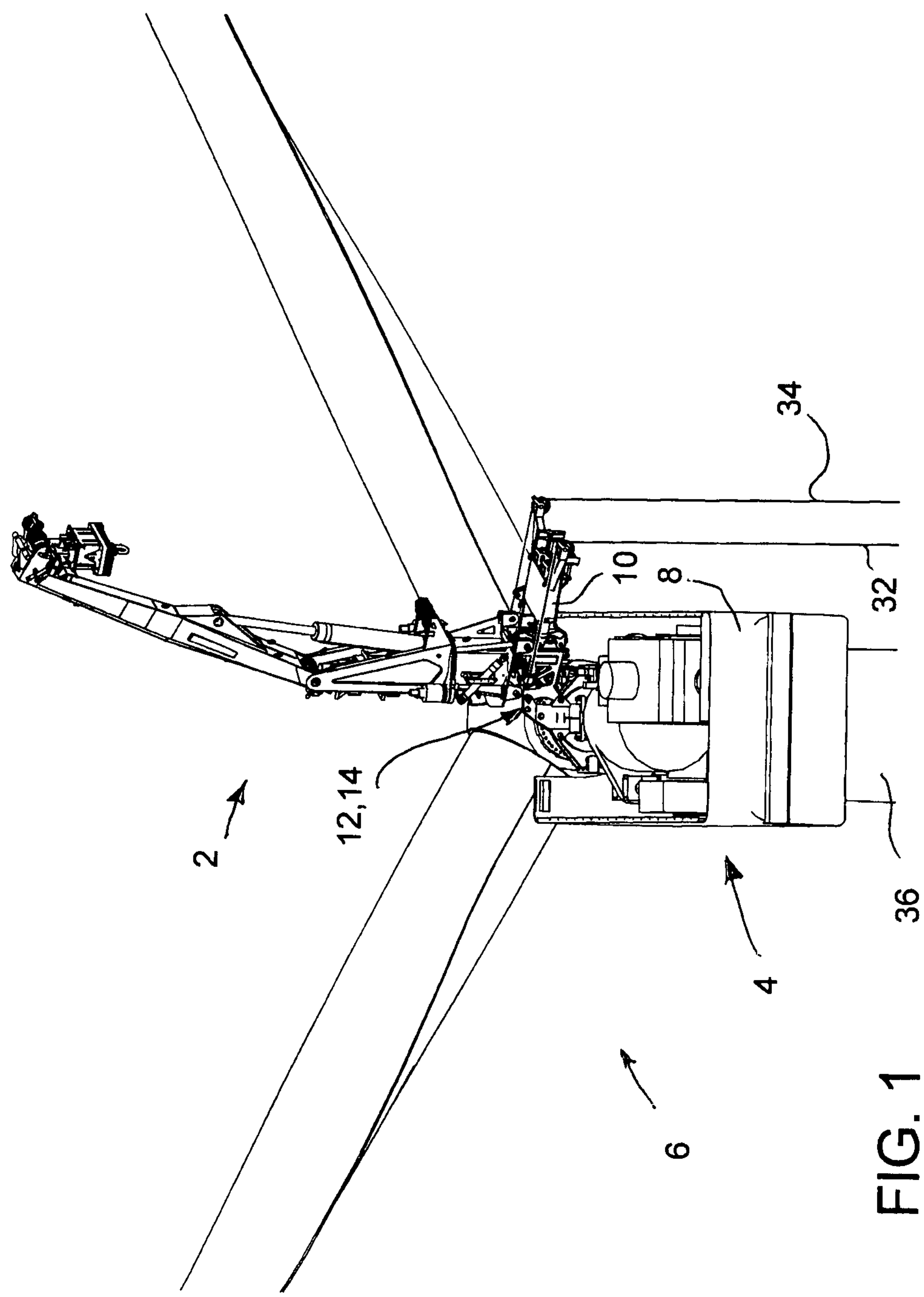
FIG. 1 is shows a nacelle of a wind turbine with a mounted crane whose hoist wires are connected with a not shown game disposed on the ground near the wind turbine tower's foot
Figure 2:
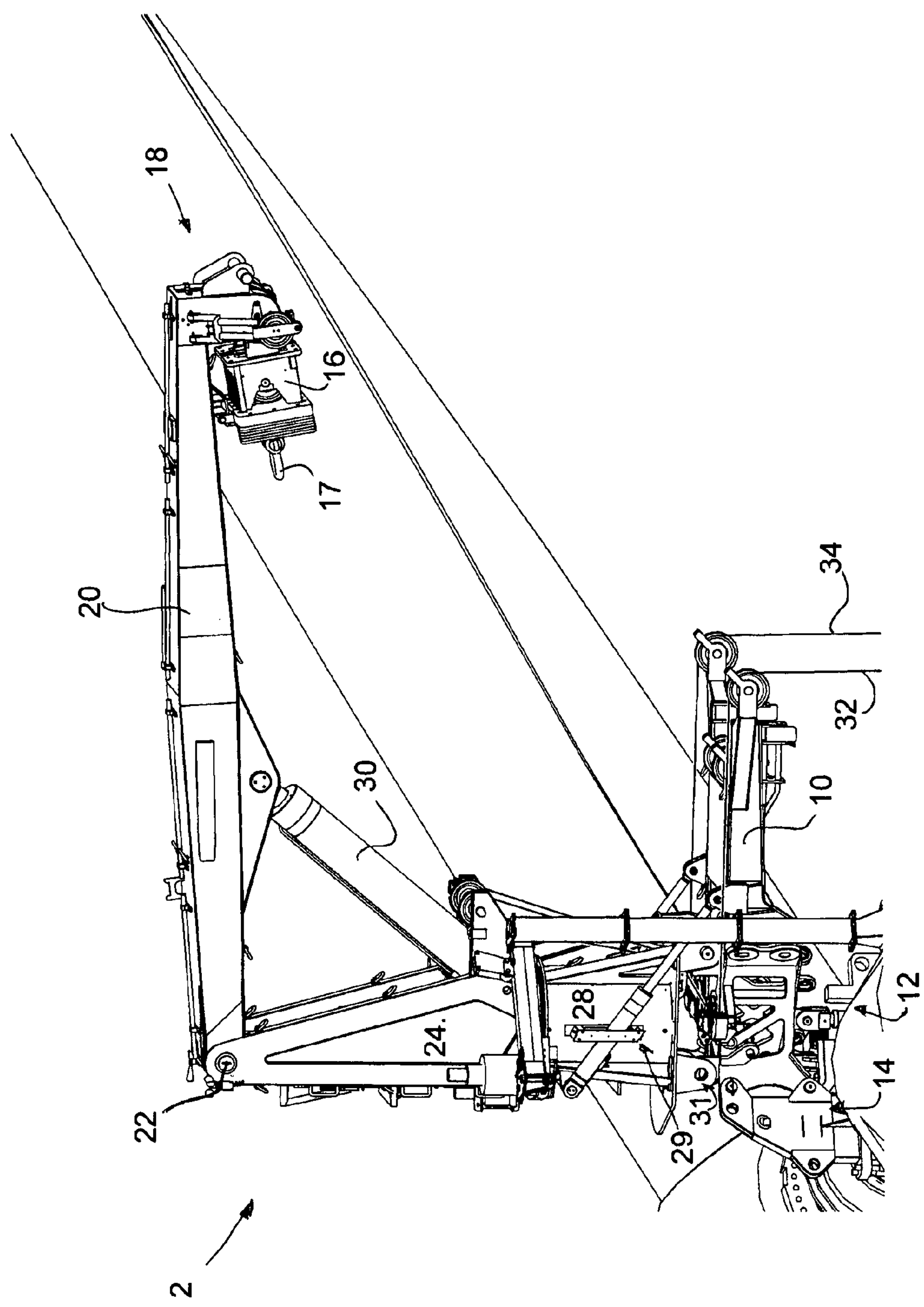
FIG. 2 shows a close-up view of the crane showed in FIG. 1.

In FIG. 1 is shown a first embodiment of a crane 2 arranged in the nacelle 4 of a wind turbine 6 for hoisting up and down of heavy parts 8 of the wind turbine arranged in the nacelle 4. The crane 2 comprises, as it more clearly appears from FIG. 2, an anchoring bracket 10 for anchoring on stable construction parts 12, 14 in the nacelle 4.

The crane 2, comprises a multiple cut pulley block 16 with a hook 17, located in the end 18 of a crane jib arm 20, which via a bearing connection 22 is secured to a beam 24 which is mounted on a second pivotal part 26 in form of an inner pivotal drum 26 (cf. FIG. 3) of the yaw 28 of the crane 2, the outer drum 29 of which is attached to the anchoring bracket 10 by securing means 31. The crane jib arm 20 and the lower end of the beam 24 is connected by a piston 30 powered by a fluid under pressure, which can be advantageously constituted by a hydraulic powered piston. The pulley block 16 is via wires 32, 34 connected to a winch arranged on the ground near the foot of the wind turbine tower 36 (cf. FIG. 1). The wires 32, 34 are via a double wire guide 38 according to the present invention (see also FIG. 4 and FIG. 5), guided up through the yaw 28 of the crane and on to the pulley block 16 via not shown wire wheels.

Figure 4:
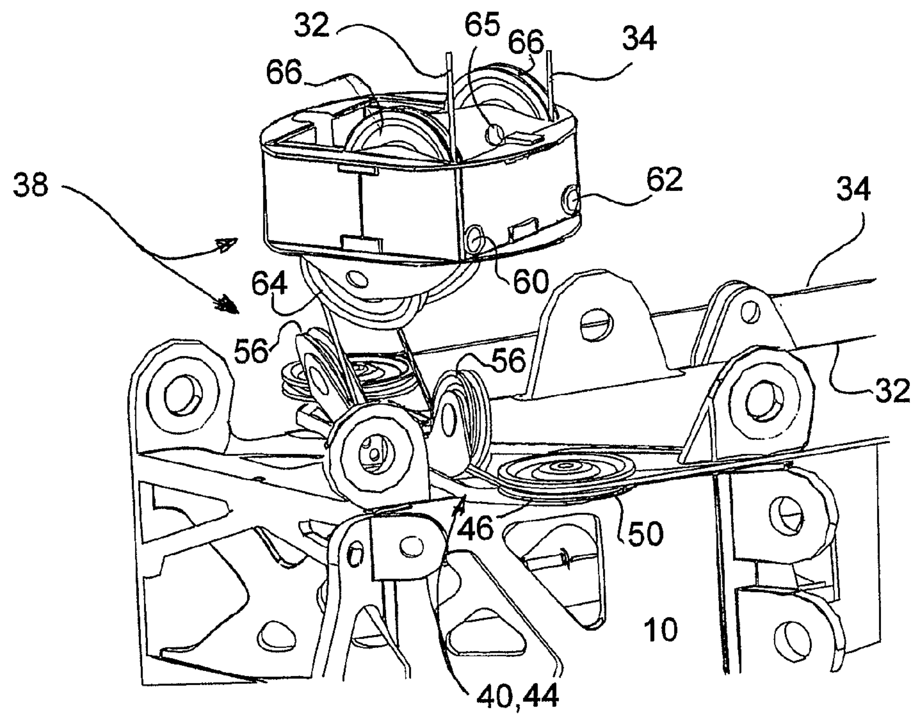
Figure 5:
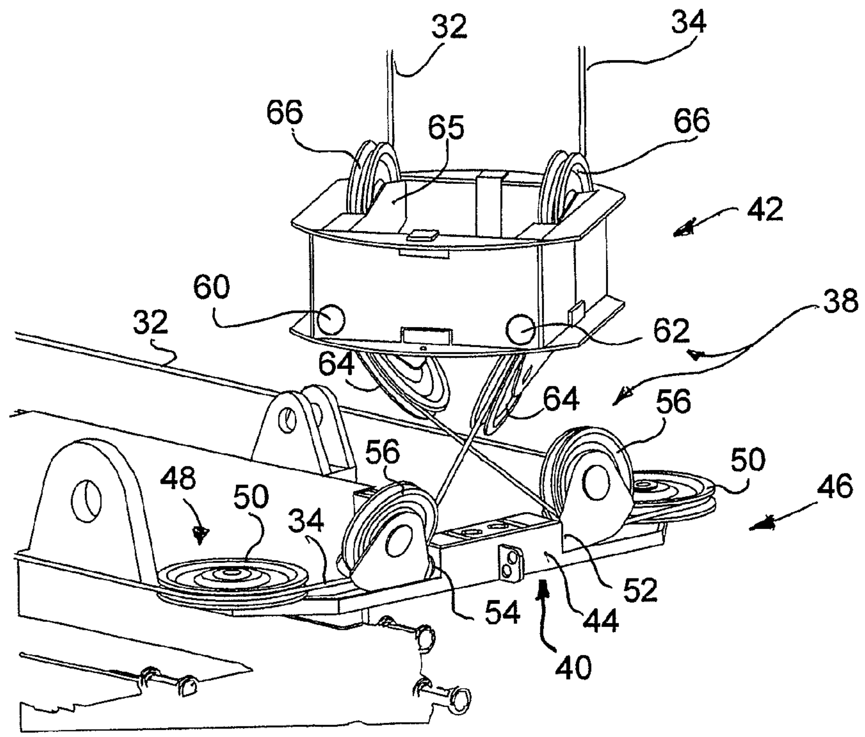
FIG. 5 shows the principle of function of the wire guide, seen from different angles.

The double wire guide 38 comprises a first fixed part 40 which is releasable attached on the anchoring bracket 10 for the crane 2, and a therewith cooperating second part 42 arranged in the inner drum 26 of the yaw 28 of the crane, and where the second part 42 is connected with the first fixed part 40 by the wires 32, 34 cf. FIG. 4 and FIG. 5.

The first fixed part 40 comprises a first elongated console 44, the free ends 46, 48 of which each comprises track cut first wire wheels 50, and between said track cut first wire wheels 50, further two, by a first pivot connection 52 and a second pivot connection 54 mounted second track cut wire wheels 56 so arranged on the console 44, that the bottom of the tracks in the second track cut wire wheels 56 at any time are located on the tangent line between the bottom of the tracks in the first track cut wire wheels 50.

The second part 42 of the wire guide is located in a level above the first fixed part 40, 44, and is situated in the inner by the yaw 28 pivotally inner drum 26. The second part 42 of the wire guide consists in the shown embodiment of a composed bracket. The bracket 42 comprises by a third pivot connection 60 and a fourth pivot connection 62 mounted fixtures 63, which here comprises third track cut wire wheels 64, said fixtures 63 and third track cut wire wheels 64 is so arranged that the bottom of the third track cut wire wheels 64 is pivotable around their uppermost tangent. The second part/the bracket 42 comprises further by second fixtures 65 fourth fixed mounted track cut wire wheels 66 from which the wires 32, 34 are lead to the pulley block 16.

Figure 3:
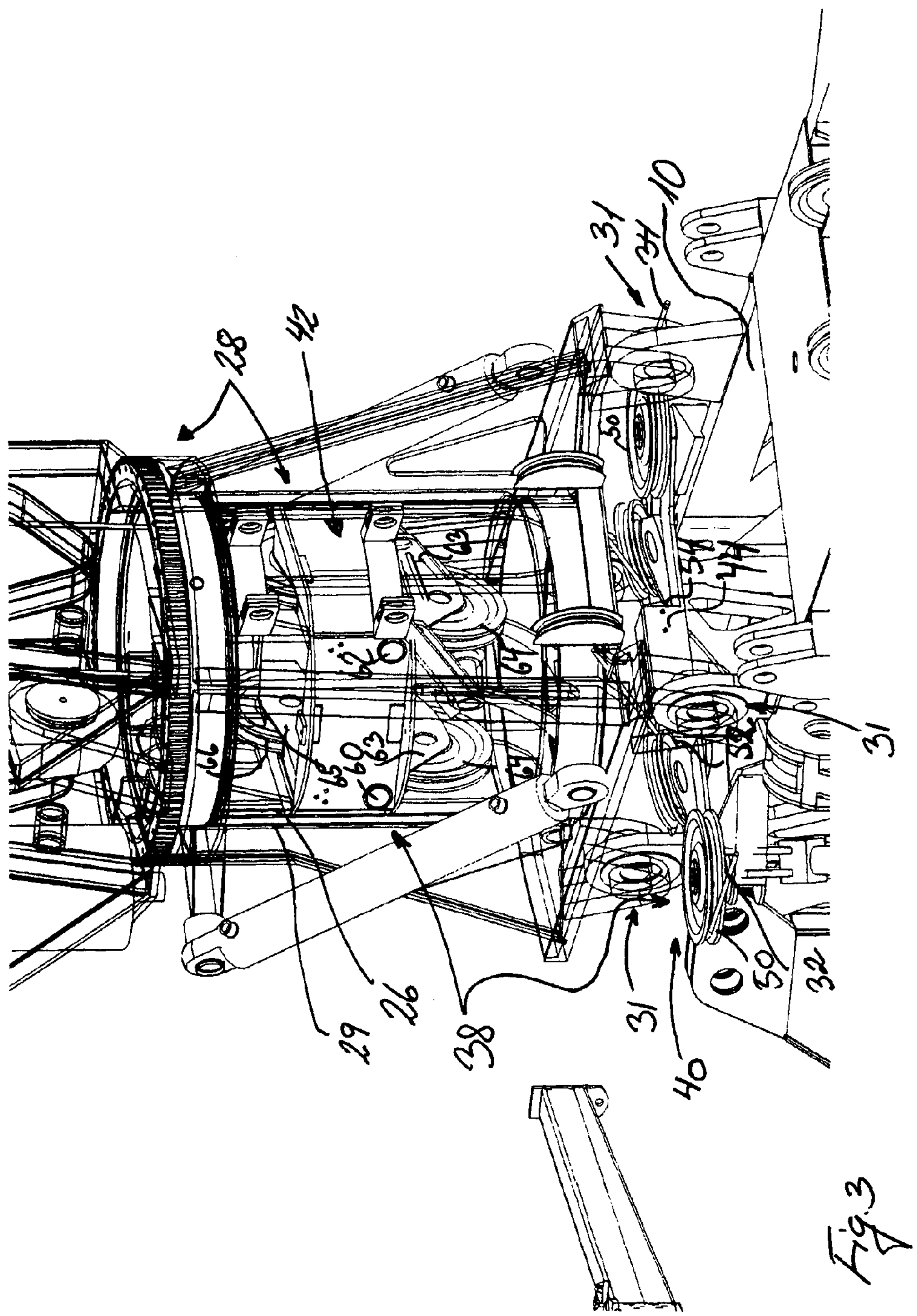
FIG. 3 is a detailed view of the crane yaw, wherein the inner and outer drums are made transparent so that the wire guide according to the invention can be seen, FIG. 4
Figure 6:
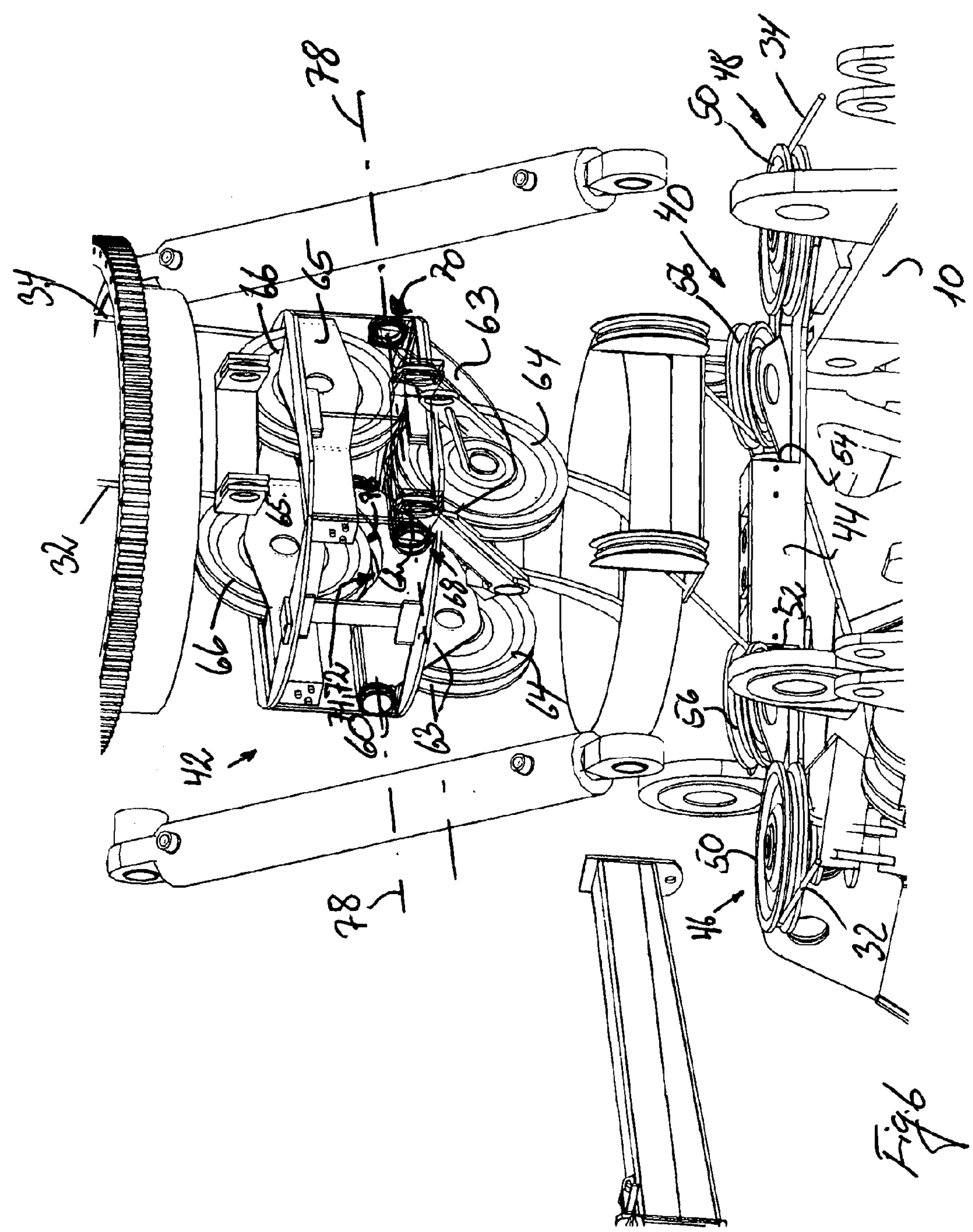
FIG. 6 is a detail view of the wire guide according to the invention, wherein the inner and the outer drum are invisible, and in which one fixture for the third track cut wheels are made transparent.

As it most clearly appears from FIG. 3 and FIG. 6, the third track cut wire wheels 64 are located closest to the first end 68 of the first fixtures 65, and the first fixtures 65 comprises take outs 74, nearest their second end 70 and against the fourth track cut wire wheels 66 facing sides 72, the geometry of said take outs 74 which corresponds a part of the against the take outs 74 facing periphery 76 of the fourth track cut wire wheels 66, for receiving said parts in a degree, where respectively the upper horizontally oriented tangent lines in the bottom of the third track cut wire wheels 64 are coincident with respectively the lower horizontally oriented tangent lines in the bottom of the fourth track cut wire wheels 66 and the center axis 78 of the third and fourth pivot connections 60, 62.

The double wire guide 38 operates in such manner, that it guides the wires 32, 34 when a yawing of the crane 2 is performed within a given interval between +/−175 degrees relative to a zero-reference point, so that the wires 32, 34 during the yawing and up- and down hoisting of burdens to and from the nacelle 4, not at any time will come into contact with each other.

The guiding of the wires takes place from given fixed introducing points for the wires 32, 34 at the fixed part of the double wire guide 38, and concurrent given fixed exit points for the wires after the double wire guide. The guiding take place by compensating for the relative turn between the first fixed part and the second by the yaw, and in the inner drum mounted, second bracket 42, by a pivot of the second track cut wire wheels 56 around respectively the first and the second pivot connection 52, 54, and the third track cut wire wheels 64 mounted in the fixtures 63 which are pivotally mounted by the third and fourth pivot connection 60, 62 to the bracket 42, whereby the deviation of the wires by performing a yawing movement with the crane is guided by the two set of pivotally mounted track cut wire wheels 56, 64 within the turning interval, so that the wires does not comes into contact with each other.

What is claimed is:

1. Crane with double wire guide and anchoring bracket arranged in a nacelle of a wind turbine for hoisting-up and -down heavy parts of the wind turbine arranged in the nacelle said crane comprises a crane yaw and an external winch with wire, located near the base of the tower of the wind turbine, said winch being connected via the wire guide to a pulley block comprising a crane hook at the end of a jib arm, wherein the wire guide comprises a first fixed part arranged on the anchoring bracket for the crane, and a therewith cooperating second part, arranged in a second pivotal part of the crane, said second pivotal part being connected with the first part by the wires, where the first fixed part comprises a first elongated console, the free ends of which each comprises first track cut wire wheels, and between said first track cut wire wheels, further two, by a first pivot connection and a second pivot connection mounted second track cut wire wheels, so arranged on the console, that the bottom of the tracks in the second track cut wire wheels at any time are located on the tangent line between the bottom of the tracks in the first track cut wire wheels, and where the second part of the wire guide is located in a level above the first fixed part and comprises by a third pivot connection and a fourth pivot connection mounted third track cut wire wheels, whereby the bottom of the third track cut wire wheels are pivotal around their uppermost located tangent and where the second part further comprises fourth fixed mounted track cut wire wheels and where the tangent lines between respectively the first and the second set of track cut wire wheels and respectively the third and fourth track cut wire wheels are running in parallel.

2. Crane with double wire guide and anchoring bracket according to claim 1, wherein the part of the wireguide is releaseable attached to an anchoring bracket for the crane arranged in the nacelle, said anchoring bracket being attached to fixed stable structural parts in the nacelle of the wind turbine.

3. Crane with double wire guide and anchoring bracket according to claim 1 wherein the second part of the wire guide is arranged in an inner tube shaped drum, which is pivotally mounted inside an outer tube shaped drum being anchored to the anchoring bracket, said tube shaped inner drum being pivotal around a center axis of said tube shape inner drum by a yaw mechanism.

4. Crane with double wire guide and anchoring bracket according to claim 3, wherein the third and fourth track cut wire wheels in the second part of the wire guide are mounted in a console, anchored inside the inner tube shaped drum, to which console the third track cut wire wheels are pivotally mounted around their uppermost tangent lines by first fixtures with a first and a second end, which by the third and fourth pivot connections are pivotally mounted to the console, and where the fourth track cut wire wheels are fixed connected to the console by second fixtures in a level above the first fixtures.

5. Crane with double wire guide and anchoring bracket according to claim 4, wherein the third track cut wire wheels are mounted closest to the first end of the first fixtures, and that the first fixtures closest to their second end, and on the against the fourth track cut wire wheels facing sides, comprises take outs the geometry of which corresponds to a part of the facing periphery of the adjacent fourth track cut wire wheels, for receiving said parts of said facing periphery to an extent where respectively the upper horizontally oriented tangent lines of the bottom of the third track cut wire wheels coincide with the lower horizontally oriented tangent lines in the bottom of the fourth track cut wire wheels, and the center axes of the third and fourth pivot connections.

* * * * *